United States Patent
Bernardi et al.

(10) Patent No.: US 11,140,023 B2
(45) Date of Patent: Oct. 5, 2021

(54) TRACE NETWORK USED AS A CONFIGURATION NETWORK

(71) Applicant: Intel Corporation, Santa Clara, CA (US)

(72) Inventors: Simona Bernardi, Munich (DE); Helmut Reinig, Isen (DE); Todor M. Mladenov, Ottobrunn (DE)

(73) Assignee: INTEL CORPORATION, Santa Clara, CA (US)

( * ) Notice: Subject to any disclaimer, the term of this patent is extended or adjusted under 35 U.S.C. 154(b) by 867 days.

(21) Appl. No.: 15/709,088

(22) Filed: Sep. 19, 2017

(65) Prior Publication Data

US 2019/0089582 A1    Mar. 21, 2019

(51) Int. Cl.
| | | |
|---|---|---|
| H04L 12/24 | (2006.01) | |
| H04L 12/751 | (2013.01) | |
| H04L 29/08 | (2006.01) | |
| H04L 12/26 | (2006.01) | |
| H04L 12/721 | (2013.01) | |

(52) U.S. Cl.
CPC .......... *H04L 41/0803* (2013.01); *H04L 45/02* (2013.01); *H04L 67/34* (2013.01); *H04L 43/50* (2013.01); *H04L 45/06* (2013.01); *H04L 69/324* (2013.01)

(58) Field of Classification Search
None
See application file for complete search history.

(56) References Cited

U.S. PATENT DOCUMENTS

| | | | | |
|---|---|---|---|---|
| 8,031,627 | B2 * | 10/2011 | Ee ........................... | H04L 45/72 370/252 |
| 10,181,993 | B2 * | 1/2019 | Ganichev ............. | H04L 12/4633 |
| 2003/0072316 | A1 * | 4/2003 | Niu ...................... | H04L 12/2854 370/412 |
| 2005/0063320 | A1 * | 3/2005 | Klotz ...................... | H04L 43/12 370/254 |
| 2006/0126508 | A1 * | 6/2006 | Hsu ........................ | H04L 1/1874 370/235 |
| 2006/0224375 | A1 * | 10/2006 | Barnett ................ | G06F 11/3495 703/22 |
| 2007/0192863 | A1 * | 8/2007 | Kapoor ................... | H04L 67/10 726/23 |
| 2007/0283072 | A1 * | 12/2007 | Johnson .............. | G06F 11/3664 710/305 |
| 2008/0162390 | A1 * | 7/2008 | Kapoor ................... | G06F 9/505 706/20 |
| 2010/0008233 | A1 * | 1/2010 | Ee ........................... | H04L 45/72 370/241 |

(Continued)

*Primary Examiner* — Ayaz R Sheikh
*Assistant Examiner* — Faiyazkhan Ghafoerkhan
(74) *Attorney, Agent, or Firm* — Spectrum IP Law Group LLC (57) ABSTRACT

An apparatus is provided which comprises: a plurality of data routers to route data packets, wherein the plurality of data routers comprises: a first data router comprising a trace port, and a second data router coupled to a component; and one or more trace routers to route trace information of the apparatus, wherein a first trace router of the one or more trace routers is coupled to the trace port, and wherein the first trace router is to route configuration information from the component to the trace port, the configuration information to configure the trace port.

18 Claims, 6 Drawing Sheets

(56) References Cited

U.S. PATENT DOCUMENTS

2012/0017262 A1* 1/2012 Kapoor .............. H04L 63/1408
    726/1
2013/0166701 A1* 6/2013 Todorov ................ H04L 67/34
    709/220

* cited by examiner

TRACE NETWORK USED AS A CONFIGURATION NETWORK

BACKGROUND

Some packet based Network-on-Chips (NoCs) may allow tracing data packets, e.g., to ease silicon debug, evaluate performance bottlenecks, estimate bandwidth, and/or the like. The trace functionality may be implemented through a dedicated trace network, which may be separate from a data network.

In some examples, a trace port of a data router of the data network may have register banks storing configure information for the trace port. It may be useful to configure the data router, e.g., the register banks of the trace port of the data router, in an efficient manner.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

In a computing system, a data network may comprise a plurality of data routers that may route data packets. Also, a trace network may comprise one or more trace routers that may route trace information. In some embodiments, a data router may be coupled to a trace router via a trace port of the data router.

In an example, a component of the computing system (e.g., a processor) may have to configure a trace port of a data router, e.g., by transmitting configuration information from the component to the trace port of the data router. In some embodiments, such configuration information may be transmitted from the component to the trace port of the data router via the trace network. For example, such configuration information may be transmitted from the component to the trace port of the data router via the trace router.

Routing the configuration information to the trace port of the data router via the trace router (e.g., instead of transmitting via data ports of the data router) has several technical effects. For example, no direct path between a data port of the data router and the trace port of the data router, e.g., for transmission of the configuration information, has to be present. This may result in reduction in complexity, area, and/or cost of the data router. In another example, using the trace network for transmission of configuration information may make the data network more available for transmission of data packets (e.g., the data network may not have to delay transmission of any data packets, to let the configuration information through). Various other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

Figure 1:
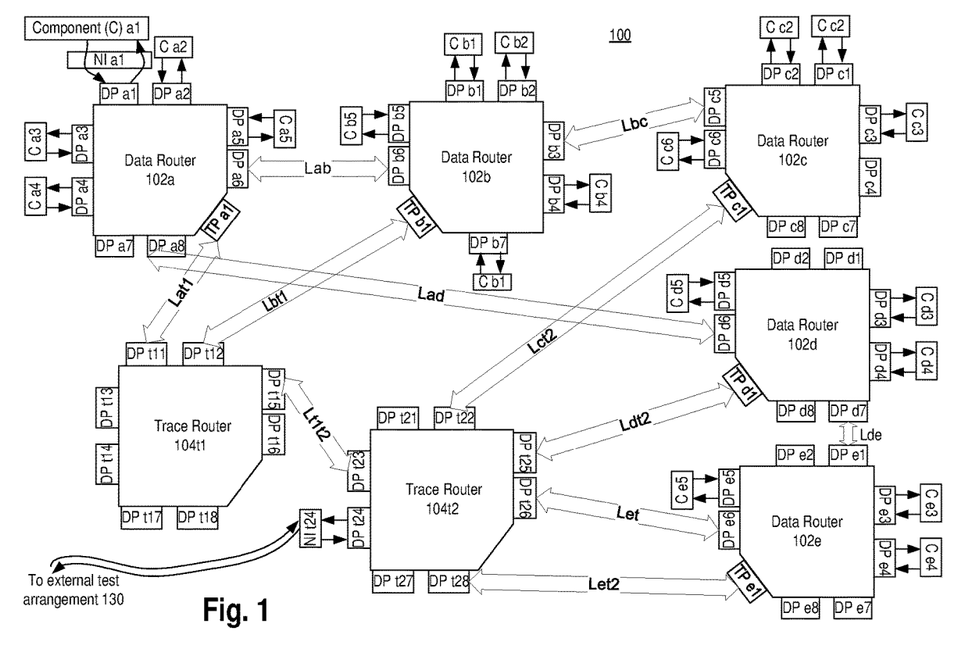
FIG. 1 illustrates a system comprising a plurality of data routers, one or more trace routers, a trace network, and a data network, wherein the trace network is selectively used to configure one or more elements of the system, according to some embodiments.

FIG. 1 illustrates a system 100 comprising a plurality of data routers, one or more trace routers, a trace network, and a data network, wherein the trace network is selectively used to configure one or more elements of the system 100, according to some embodiments.

In some embodiments, the system 100 comprises the plurality of data routers 102a, 102b, 102c, 102d, and 102e, and one or more trace routers 104t1 and 104t2. Elements referred to herein with a common reference label followed by a particular number or alphabet may be collectively referred to by the reference label alone. For example, data routers 102a, . . . , 102e may be collectively and generally referred to as data routers 102 in plural, and data router 102 in singular. Similarly, trace routers 104t1 and 104t2 may be collectively and generally referred to as trace routers 104 in plural, and trace router 104 in singular.

Although FIG. 1 illustrates a specific number and layout of the data routers 102 and the trace routers 104t, the number and/or the layout of these routers are merely examples and do not limit the scope of this disclosure. Merely as an example, although two trace routers 104 are illustrated in FIG. 1, in some embodiments, one, three, or higher number of trace routers 104t may also be possible.

In some embodiments, individual data routers 102 may comprise a corresponding plurality of data ports. For example, the data router 102a comprises data ports DP a1, DP a2, . . . , DP a8, the data router 102b comprises data ports DP b1, DP b2, . . . , DP b7, and so on. In some embodiments, a data router 102 may communicate with external components via the corresponding data ports, as discussed herein in further detail.

In some embodiments, a data port of a data router may be communicatively coupled to a corresponding component. For example, the data port DP a1 of the data router 102a may be coupled to a component C a1, the data port DP b2 of the data router 102b may be coupled to a component C b2, and so on. In an example, not all the data ports of a data router 102 may be connected to corresponding components. For example, data ports DP a7, DP a6, DP c4, etc. are not connected to corresponding components in the example of FIG. 1.

In some embodiments, a connection between a data port and a corresponding component may be via a corresponding network interface (NI), although not all such NIs are illustrated in FIG. 1 for purposes of illustrative clarity. For example, only a single network interface NI a1 between the data port DP a1 and the component C a1 is illustrated in FIG. 1. Merely as an example, a network interface NI a2 may be coupled between the data port DP a2 and the component C a2, although such a network interface is not illustrated in FIG. 1 for purposes of illustrative clarity.

In some embodiments, the data routers 102 may route packets (e.g., data packets, instructions packets, configuration packets, etc., as discussed herein later) from a source (e.g., a source component) to a destination (e.g., a destination component) through different levels of arbitrations.

The components C a1, C a2, . . . , C e5 may be any appropriate components that may be coupled to data routers 102. Merely as an example, individual ones of the components C may be processors, processing cores, memory, Input/Output ports such as Universal Serial Bus (USB) ports, Peripheral Component Interconnect Express (PCIe) ports, Direct memory access (DMA) controllers, and/or any other appropriate component.

In some embodiments, individual data routers 102 may comprise corresponding trace ports TP. For example, data router 102a may comprise a trace port TP a1, data router 102b may comprise a trace port TP b1, data router 102e may comprise a trace port TP e1, and so on. A data router 102 may communicate with a trace router 104t via a corresponding trace port TP.

In some embodiments, each of the trace routers 104t1 and 104t2 may have corresponding plurality of data ports. For example, trace router 104t1 may comprise data ports DP t11, DP t12, . . . , DP t18; and trace router 104t2 may comprise data ports DP t21, DP t22, . . . , DP t28.

In some embodiments, a data router 102 may be communicatively coupled to one or more other data routers via corresponding communication link(s). For example, data router 102a may be coupled to data routers 102b and 102d via links Lab and Lad, respectively; data router 102b may also be coupled to data router 102c via link Lbc, and so on. In some embodiments, the links between two data routers may also be referred to as data communication links, or as data links (e.g., links Lab, Lbc, etc.). In some embodiments, the data links may be bidirectional communication links, although in some examples, one or more of the data links may be unidirectional communication links In some embodiments, a data router 102 may also be coupled to at least one corresponding trace router 104t via a corresponding communication link and via a corresponding trace port TP. For example, data router 102a may be coupled to the trace router 104t1 via the trace port TP a1 of the data router 102a, data port DP t11 of the trace router 104t1, and via link Lat1. In another example, data router 102c may be coupled to the trace router 104t2 via the trace port TP c1 of the data router 102c, data port DP t22 of the trace router 104t2, and via link Lct2. Thus, a trace port TP of a data router 102 is connected to a corresponding data port of a corresponding trace router 104t.

In some embodiments, a data port of at least one data router 102 may be coupled to a data port of at least one trace router 104t. In the example of FIG. 1, the data port DP e6 of the data router 102e may be coupled to the data port DP t26 of the trace router 104t2. Although FIG. 1 illustrates only a single data port of a single data router being coupled to a data port of a trace router, in some embodiments, one or more data ports of one or more data routers may be coupled to one or more data ports of one or more trace routers.

In some embodiments, the trace routers 104t1 (e.g., the data port DP t15 of the trace router 104t1) may be coupled to the trace router 104t2 (e.g., to the data port DP t23 of the trace router 104t2) via a bidirectional communication link Lt1t2.

In some embodiments, links connected to a trace router may also be referred to as trace communication links, or as trace links (e.g., links Lat1, Lbt1, Let2, Lt1t2, etc.). Thus, a trace link is to couple a data port of a trace router to a trace port of a data router (e.g., links Lat1, Lbt1, Let2, etc.), or is to couple data ports of two trace routers (e.g., link Lt1t2). For example, the trace links are to transmit trace information.

In some embodiments, the link Let between the data port of the data router 102e and the data port of the trace router 104t2 may not transmit trace information or data information—this link may, however, transmit configuration information, as discussed herein later. In some embodiments, this link Let may also be referred to as a "hybrid link" (e.g., because it connects a trace router and a data port of a data router, and does not transmit any trace information). In some embodiments, this link Let may also be referred to as a "configuration link" (e.g., because it may transmit configuration information).

In some embodiments, at least one data port of at least one trace router may be coupled to an external test arrangement 130. For example, in FIG. 1, the data port DP t24 of the trace router 104t2 may be coupled to the external test arrangement 130, e.g., via a network interface NI t24.

In some embodiments and merely as examples, individual ones of the communication links coupling two data routers (e.g., links Lab, Lad, Lbc, etc.) may comprise a 32 bit bidirectional communication bus, a 64 bit bidirectional communication, or the like. In some embodiments and merely as examples, individual ones of the links between the trace routers and the data routers (e.g., links Lat1, Lct2, etc.) may comprise a 16 bit bidirectional communication bus, or the like.

Figure 2:
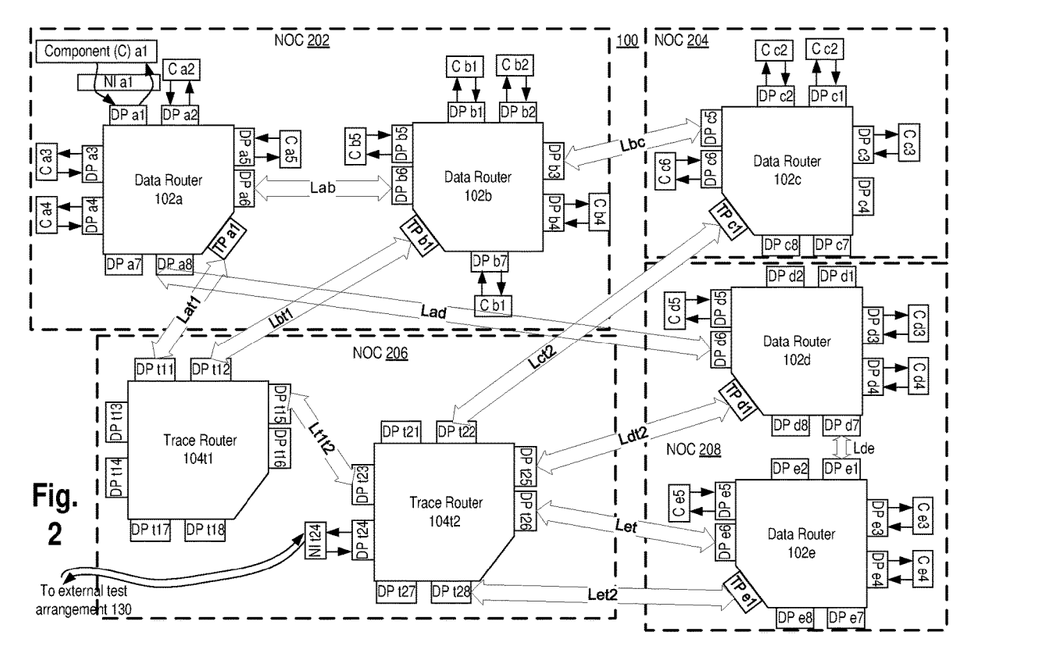
FIG. 2 illustrates the system of FIG. 1, where various components and routers may be included in one or more Network on Chips (NOCs), according to some embodiments.

In some embodiments, various components and routers illustrated in FIG. 1 may be included in one or more Network on Chips (NOCs). For example, FIG. 2 illustrates the system 100 of FIG. 1, where various components and routers may be included in one or more NOCs, according to some embodiments. FIG. 2 may be at least in part similar to FIG. 1. However, unlike FIG. 1, FIG. 2 illustrates NOCs 202, 204, 206, and 208. The trace routers 104t1 and 104t2 may be included in a trace network NOC 206. The routers 102a and 102b may be included in the NOC 202; the router 102c may be included in the NOC 204; and the routers 102d and 102e may be included in the NOC 208. In some embodiments, the NOCs 202, 204, and 208 may also be referred to as data network NOCs. It is to be noted that the number and/or boundaries of the NOCs of FIG. 2 are merely examples, and do not limit the scope of this disclosure.

In FIG. 2, the components Ca1, . . . , Ce4 are illustrated to be included within the NOCs 202, 204, and 208. However, these components Ca1, . . . , Ce4 may be external to the NOCs 202, 204, and 208. For example, these components are shown to be included in various NOCs merely for purposes of simplifying the figure, and in some embodiments, at least some of these components (e.g., all of these components) may be external to the NOCs 202, 204, and 208. In some embodiments, the network interfaces coupled to the data routers 102 (e.g., only a single network interface NI a1 is illustrated) may be included within the respective NOCs.

Various embodiments have been discussed herein with respect to FIG. 1. However, it should be understood that the discussion with respect to FIG. 1 may also apply to the system depicted in FIG. 2.

Referring again to FIG. 1, in some embodiments, the system 100 comprises a data network and a trace network (although the two networks are not separately labeled in FIG. 1). As an example, the data network may comprise the data routers 102a, . . . , 102e, the data links between various data networks (e.g., links Lab, Lbc, Lad, and so on), and the network interfaces coupling components to their respective data ports of the data routers (e.g., only a single network interface NI a1 is illustrated in FIG. 1). In some embodiments, the links between the network interfaces and the corresponding data routers may also be included within the data network.

From a functional point of view, the data network may communicate data packets, instructions packets, etc. In some embodiments, the data network may communicate configuration packets. Usually, the data network may not (e.g., cannot) carry packets associated with trace functionality of the system 100 (e.g., may not, or cannot, carry trace packets).

In some embodiments, the trace network may comprise the trace routers 104t1 and 104t2, the trace links attached to the trace routers (e.g., links Lat1, Lbt1, Lct2, Ldt2, Let2, Let), and one or more network interfaces respectively coupling one or more components to respective data ports of the trace routers (e.g., only a single network interface NI t24 is illustrated in FIG. 1). In an example, the trace ports of the data routers (e.g., trace port TP a1 of data router 102a) may also be a part of the trace network.

From a functional point of view, the trace network may communicate trace information and/or debug information, e.g., in the form of trace packets. In some embodiments, the trace network may transmit or carry configuration packets. Usually, the trace network may not carry data packets, instructions packets, etc.

In some embodiments, the trace network may be configured to gather trace information, debug information, etc., from the system 100. For the purposes of this disclosure, trace information may imply any information (e.g., including any debug information) that may be collected by the trace routers 104t1 and/or 104t2 from the system 100. In some embodiments, all or at least some of the trace information may be transmitted to the external test arrangement 130

For example, while testing and/or debugging the system 100, the trace ports of the data routers (e.g., trace port TP a1 of the data router 102a) may gather information or statistics of packets flowing over the data network via the data router 102a. For example, the trace port of a data router may sniff or otherwise access information of the packets flowing from a source to a destination via the data router. The trace port may gather such information, which may be the trace information, and transmit such trace information to the trace router.

For example, the trace port TP a1 may gather trace information associated with the packets flowing through the data ports of the data router 102a, and transmit such trace information to the trace router 104t1 via the link Lat1. The trace router 104t1 may transmit such trace information to the external test arrangement 130, e.g., via the link Lt12 and the trace router 104t2.

Merely as examples, trace information associated with a data packet travelling via the data router 102a may comprise trace statistics such as a destination port of the packet, a source port of the packet, a type of instruction associated with the packet (e.g., whether the packet is associated with a read request, a write request, a completion request, etc.). In another example, the trace information associated with the data packet travelling via the data router 102a may comprise a copy of the header of the packet. In yet another example, a trace port (e.g., trace port TP a1) may be configured to maintain a count of packets traversing through individual (or all) the data ports of a corresponding data router (e.g., data router 102a), maintain a count or history of various configuration information of such packets, etc., and output such information as trace information.

Figure 3:
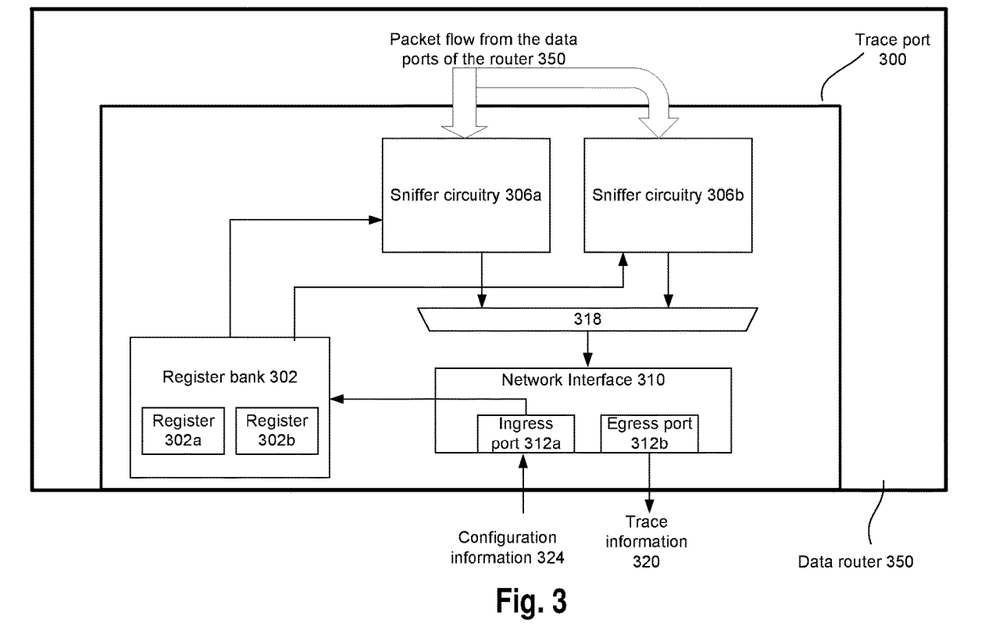
FIG. 3 illustrates an example trace port included in a data router, according to some embodiments.

FIG. 3 illustrates an example trace port 300 included in a data router 350, according to some embodiments. The trace port 300 may correspond to any of the trace ports (e.g., TP a1, TP b1, TP e1, etc.) of FIG. 1, and the data router 350 may correspond to any of the corresponding data routers (e.g., data routers 102a, . . . , 102e) of FIG. 1.

In some embodiments, the trace port 300 may comprise a network interface 310 to communicate with a corresponding trace router. For example, if the trace port 300 corresponds to the trace port TP a1 of the data router 102a, then the network interface 310 may communicate with the trace router 104t1 of FIG. 1.

In some embodiments, the network interface 310 may comprise an egress port 312b to output, among other information, trace information 320. In some embodiments, the network interface 310 may further comprise an ingress port 312a to receive, among other information, configuration information 324. The trace information 324 may comprise information that the trace routers may eventually output to the external test arrangement 130.

In some embodiments, the trace port 300 may comprise register banks 302 comprising a plurality of registers, e.g., registers 302a, 302b, etc. Although only two example registers 302a and 302b are illustrated to be included in the register bank 302, the register bank 302 may comprise any other appropriate number of registers.

In some embodiments, the trace port 300 may comprise a plurality of sniffer circuitries, e.g., sniffer circuitries 303a and 306b. Although not illustrated in FIG. 3, individual sniffer circuitry 306 may comprise control logic, one or more filters, filter Look-Up Tables (LUTs), statistics collection counters, overflow detection logic, packet type selection multiplexers, and/or the like.

The sniffer circuitries 306a, 306b may sniff packets passing through the data ports of the data router 350. The sniffer circuitry 303a and/or the sniffer circuitry 306b may collect trace information 320, e.g., based on observing, sniffing, and/or processing the packets. The sniffer circuitries 306a, 306b may output the trace information 320 to the network interface 310, e.g., via multiplexers 318.

In some examples, the sniffer circuitries 306a, 306b may operate in a trace mode, a statistics mode, and/or the like. The sniffer circuitries 306a, 306b may analyze and filter the header of the packets entering the router data ports, e.g., based on the content of configurable registers 302a, 302b. For example, while testing and/or debugging the system 100, the trace port 300 may gather information or statistics of packets flowing via the data ports of the data router 350. For example, the sniffer circuitries 306a, 306b may sniff or otherwise access information of the packets flowing from a source to a destination via the data router 350. The sniffer circuitries 306a, 306b may gather such information in the form of trace information 320. Merely as examples, trace information 320 may comprise trace statistics such as a destination port of a packet, a source port of the packet, a type of instruction associated with the packet (e.g., whether the packet is associated with a read request, a write request, a completion request, etc.). In another example, the trace information 320 may comprise a copy of the header of the packet. In yet another example, a sniffer port 306 may be configured (e.g., via the register bank 302) to maintain a count of packets traversing through individual (or all) the data ports of the data router 350, maintain a count or history of various configuration information of such packets, etc., and output such information as trace information 320.

In some embodiments, the registers 302a, 302b of the register bank 302 may store configuration information, e.g., to configure the trace port 300 (e.g., to configure the sniffer circuitries 306a, 306b). For example, the register bank 302 may comprise configuration information that may dictate the type of trace information to be collected by the sniffer circuitries 306a, 306b, when and how long to collect the trace information, etc. For example, the register bank 302 may comprise configuration information that may be used to configure filters, counters, logic, etc. within the sniffer circuitries 306a, 306b, configure a mode of operation of the sniffer circuitries 303a and/or 306b, etc.

In some embodiments, at least part of the configuration information stored in the register bank 302 may be received by the trace port 300 as configuration information 324. For example, upon receiving the configuration information 324 from the trace router via the ingress port 312a, the network interface 310 may process the configuration information 324 using a depacketizer logic (which may be included in the network interface 310, not illustrated in FIG. 3). The depacketizer logic may convert the configuration information 324 into a register access to the register bank 302.

Figure 4A:
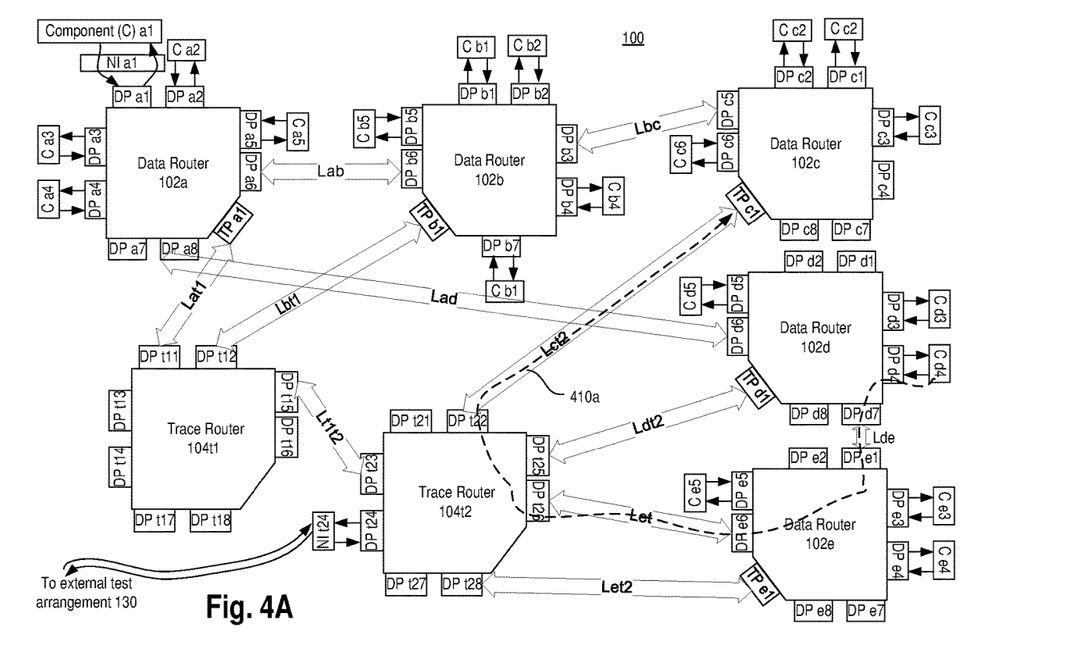
FIG. 4A illustrates an example of transmission of configuration information from a source component to a register bank of a trace port via a trace network and a data network of the system of FIG. 1, according to some embodiments.

FIG. 4A illustrates an example of transmission of configuration information 324 from a source component (e.g., component C d4) to the register bank 302 of a trace port (e.g., trace port TP c1) via the trace network and the data network of the system 100 of FIG. 1, according to some embodiments. In this example, the source of the configuration information 324 is the component C d4. Merely as an example, the component C d4 may be a processor that may want to configure the register bank 302 of the trace port TP c1, e.g., to eventually configure the trace port TP c1 (e.g., configure the sniffer circuitries 306a, 306b of the trace port TP c1).

In some embodiments, the flow of configuration information 324 is illustrated using dotted line 410a, and the corresponding path is referred to as path 410a. In some embodiments, the path 410a may traverse through the data network and the trace network. For example, as illustrated in FIG. 4A, the configuration information 324 may originate from the component C d4, traverse through the data router 102d, link Lde, data router 102e, link Let, trace router 104t2, link Lct2, and may then reach the trace port TP c1.

Thus, in this example, the path 410a may comprise a portion of the data network, where the portion of the data network may comprise the data routers 102d, 102e, and the data link Lde. Furthermore, the path 410a may comprise a portion of the trace network, where the portion of the trace network may comprise the trace router 104t2, and the trace link Lct2. Thus, the configuration information 324 in the example of FIG. 4A may reach the intended trace port TP c1 via the data network and the trace network.

Thus, in the example of FIG. 4A, the trace network is utilized at least in part to configure the register banks of the trace port. In some embodiments, such configuration of the trace port TP c1 may be performed when, for example, the trace network is not used for tracing operations (e.g., to avoid transmission of trace information 320 and configuration information 324 at the same time over the trace network). Thus, in some embodiments, the transmission of the configuration information 324 over the path 410a and possible transmission of trace information 320 may be performed in a time multiplexed manner. In some other embodiments, some of the trace links may be bidirectional, and when a first direction of a first trace link transmits trace information 320, another direction of the first trace link (or a second trace link) may transmit the configuration information—in such examples, the transmission of the configuration information 324 over the path 410a and possible transmission of trace information 320 may be performed at least in part in parallel.

In might be possible to transmit the configuration information 324 from the component C d4 entirely via the data network (e.g., avoiding the trace network), e.g., via the data router 102d, the data link Lad, the data router 102a, the data link Lab, the data router 102b, the data link Lbc, and eventually the data router 102c. However, in some examples, such a path via solely the data network may have additional latency (e.g., compared to the path 410a).

In some embodiments, the path 410a may use at least in part the trace network, and may leave the more critical data network for other critical data transmission purposes.

In some examples (e.g., not the example of FIG. 4A), a path for transmitting configuration information via the trace network and the data network may have additional latency, e.g., compared to that of a path that may traverse solely via the data network. However, latency may not be a critical issue in configuring a trace port, as such configuration may not be a critical time sensitive job.

In some embodiments, configuring a trace port may be simplified if the same trace network is also used to configure its own registers. For example, no dedicated infrastructure may have to be implemented to transport configuration packets to the router trace ports (e.g., no path need to be present from the data ports of the data router 102c to the register bank within the trace port 102c), e.g., thereby reducing an area, complexity and/or cost of the data router 102c.

In a conventional system, in addition to the data network and a trace network, a configuration network may be present to transmit the configuration information to respective trace ports. However, in the system 100, as the trace network may at least in part transmit such configuration information, any such configuration network may be redundant, thereby saving complexity, area and cost over such a conventional system.

In some embodiments, in the system 100, wires and/or arbitration resources may be shared between the trace information 320 and the configuration information 324, which may reduce gate count and/or routing congestion in the system 100.

In some embodiments, using the trace network for transmission of configuration information may make the data network more available for transmission of data packets (e.g., the data network may not have to delay transmission of any data packets, to let the configuration information through).

In some embodiments and in the system 100, no special infrastructure may be needed to access the register banks of the trace ports (e.g., infrastructure from the data ports of the data router 102c to the register bank of the trace port TP c1), thereby reducing maintenance efforts, e.g., in case of router or packet features update. In some embodiments, the trace network, including the sniffer network interfaces, may be placed entirely in a separate power domain(s) from the main data network.

Furthermore, although FIG. 4A discusses configuring the register bank of a trace port, the principles of this disclosure may also be applied to configure any other type of registers or components of a data router or a trace router. For example, a combination of the data network and the trace network may be used to transmit configuration information to configure registers of the data ports of the trace routers, registers of the data ports of the data routers, etc. In some embodiments, the trace network may be used for other network configuration purposes that may be independent of the primary data network (e.g. power control of primary network, clock control, etc.). In some embodiments, the trace network may be used for one or more other network configuration purposes, e.g., to configure one or more registers related to the data router data ports and/or arbitration schemes, which may be controlled through the trace network.

Various embodiments discussed herein assumes that the configuration information 324 originates from a component coupled to a data router. However, in some embodiments, configuration information 324 (or another set of similar configuration information) may also be generated by the external test arrangement 130, and may be received by the trace router 104t2 (e.g., via the data port DP t24 of the trace router 104t2). In such an example, the configuration information may be transmitted solely through the trace network to an intended trace port of a data router. For example, if the external test arrangement 130 is to generate configuration information for the trace port TP c1 of the data router 102c, such configuration information may be transmitted via the trace router 104t2 and trace link LCt2 to the trace port TP c1 (e.g., transmitted solely through the trace network).

Although FIG. 4A illustrates using both the data network and the trace network to transmit configuration information 324 to a trace port of a data router, in some embodiments, the system 100 may adaptively choose to (i) use both the data network and the trace network to transmit configuration information 324 to a trace port of a data router, (ii) use solely the trace network to transmit the configuration information to the trace port of the data router (e.g., when the configuration information is generated by the external test arrangement 130), and/or (iii) use solely the data network to transmit configuration information 324 to the trace port of the data router. In some embodiments, choosing between the three options may be based on a plurality of factors, e.g., length of a shortest route for the two options, source of the configuration information, destination of the configuration, power states of the data routers and/or trace routers (e.g., whether a router is in a low power mode and hence is to be avoided for transmitting such configuration information), and/or the like.

Figure 4B:
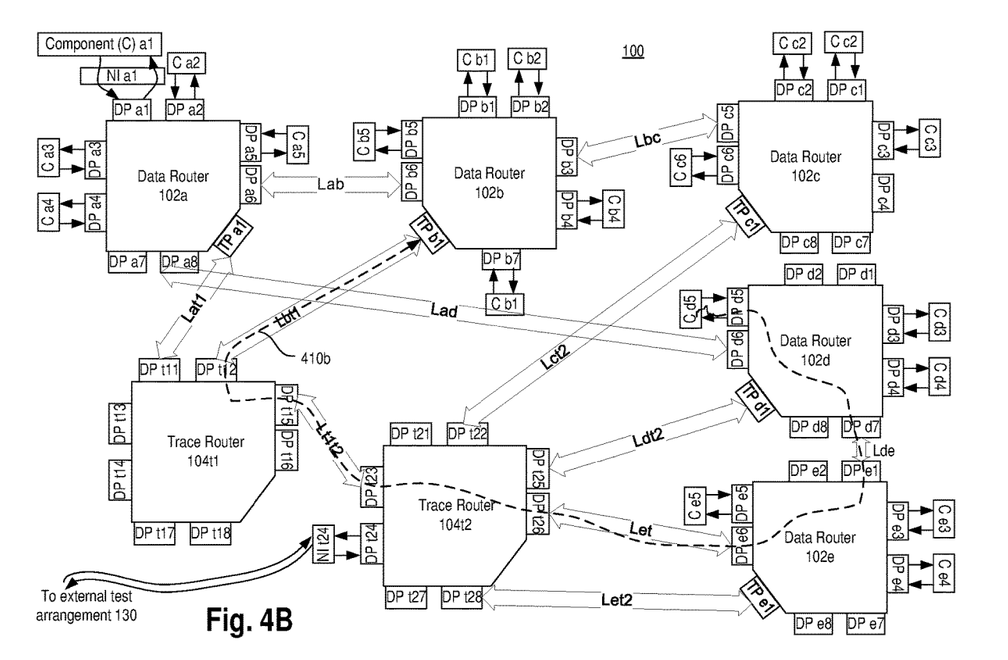
FIG. 4B illustrates another example of transmission of configuration information from another source component to the register bank of another trace port via the trace network and the data network of the system of FIG. 1, according to some embodiments.

FIG. 4B illustrates another example of transmission of configuration information 324 from another source component (e.g., component C d5) to the register bank 302 of a trace port (e.g., trace port TP b1) via the trace network and the data network of the system 100 of FIG. 1, according to some embodiments. In some embodiments, the flow of configuration information 324 is illustrated using dotted line 410b, and the corresponding path is referred to as path 410b. In some embodiments, the path 410b may traverse through the data network and the trace network. For example, as illustrated in FIG. 4B, the configuration information 324 may originate from the component C d5, traverse through the data router 102d, data link Lde, data router 102e, link Let, trace router 104t2, trace link Lt1t2, trace router 104t1, and trace link Lbt1, and may then reach the trace port TP b1.

It is to be noted that, as illustrated in FIGS. 4A and 4B, the configuration information 324 may enter the trace network via the configuration link Let and the trace router 104t2. In the example system 100, the link Let may be the only link illustrated between a trace router and a data port of a data router (e.g., links the trace router 104t2 and the data port DP e6 of the data router 102e). In some embodiments and although not illustrated in the figures, the system 100 may comprise multiple links, e.g., such that each of these multiple links may be between a trace router and a corresponding data port of a corresponding data router (e.g., between data port DP t3 of the trace router 104t1 and data port DP a7 of the data router 102a). In an example, existence of such multiple links may reduce a latency or a path length to transmit configuration information 324 to a trace port via the data network and the trace network.

In some embodiments, the trace network and the data network discussed herein (e.g., with respect to FIGS. 1, 2, 4A, and 4B) may use the same or similar underlying physical layer technology. This may allow a direct link between a data port of a data router and data port of a trace router (e.g., link Let between data router 102e and trace router 104t2). However, in some other embodiments, the trace network and the data network may use at least in part different underlying physical layer technology. This may require a network interface and/or a bridge between, for example, the data port DP e6 of the data router 102e and the data port DP t26 of the trace router 104t2, e.g., to implement the link Let. The principles of this disclosure may be applied in both these scenarios (e.g., irrespective of whether the trace network and the data network use similar or different underlying physical layer technology).

Figure 5:
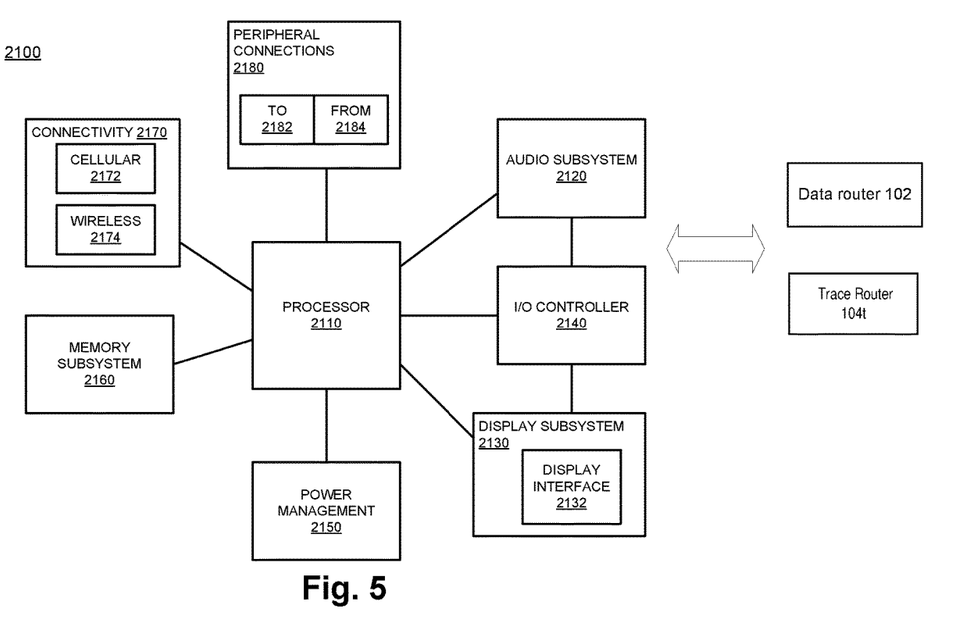
FIG. 5 illustrates a computing device comprising a plurality of data routers, one or more trace routers, a trace network, and a data network, wherein the trace network is selectively used to configure one or more elements of the computing device, according to some embodiments.

FIG. 5 illustrates a computing device 2100 (e.g., a smart device, a computing device or a computer system or a SoC (System-on-Chip)) comprising a plurality of data routers, one or more trace routers, a trace network, and a data network, wherein the trace network is selectively used to configured one or more elements of the computing device 2100, according to some embodiments. It is pointed out that those elements of FIG. 5 having the same reference numbers (or names) as the elements of any other figure can operate or function in any manner similar to that described, but are not limited to such.

In some embodiments, the computing device 2100 represents an appropriate computing device, such as a computing tablet, a mobile phone or smart-phone a laptop, a desktop, an IOT device, a server, a set-top box, a wireless-enabled e-reader, or the like. It will be understood that certain components are shown generally, and not all components of such a device are shown in computing device 2100.

In some embodiments, computing device 2100 includes processors 2110. The various embodiments of the present disclosure may also comprise a network interface within 2170 such as a wireless interface so that a system embodiment may be incorporated into a wireless device, for example, cell phone or personal digital assistant.

In one embodiment, processors 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi, and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the computing device 2100 may comprise a plurality of data routers 102a, 102b, . . . , 102e, etc. (e.g., represented symbolically as data router 102 in FIG. 5) and one or more trace routers 104t1, 104t2 etc. (e.g., represented symbolically as trace router 104t in FIG. 5), where the data routers may interconnect various components of the computing device 2100. For example, various components of the computing device 2100 (e.g., the processor 2110, the memory subsystem 2160, etc.) may correspond to one or more of the components Ca1, Ca2, . . . , Ce5 of FIG. 1. In some embodiments, a component (e.g., the processor 2110) may configure a trace port of a data router 102, e.g., via the data network and the trace network, e.g., as discussed with respect to FIGS. 1-4B herein.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following clauses pertain to further embodiments. Specifics in the examples may be used anywhere in one or more embodiments. All optional features of the apparatus described herein may also be implemented with respect to a method or process.

Example 1

An apparatus comprising: a plurality of data routers to route data packets, wherein the plurality of data routers comprises: a first data router comprising a trace port, and a second data router coupled to a component; and one or more trace routers to route trace information of the apparatus, wherein a first trace router of the one or more trace routers is coupled to the trace port, and wherein the first trace router is to route configuration information from the component to the trace port, the configuration information to configure the trace port.

Example 2

The apparatus of example 1 or any other example, further comprising: a plurality of data links, wherein individual data link of the plurality of data links is to couple two corresponding data routers of the plurality of data routers; and a plurality of trace links, wherein individual trace link of the plurality of trace links is to couple a trace port of a corresponding data router of the plurality of data routers to a corresponding trace router of the one or more trace routers.

Example 3

The apparatus of example 2 or any other example, wherein: at least one trace link of the plurality of trace links and at least one data link of the plurality of data links are to route the configuration information from the component to the trace port.

Example 4

The apparatus of example 2 or any other example, further comprising: a configuration link that is to couple a data port of at least one data router of the plurality data routers and the first trace router, wherein the configuration link, at least one trace link of the plurality of trace links, and at least one data link of the plurality of data links are to route the configuration information from the component to the trace port.

Example 5

The apparatus of example 2 or any other example, further comprising: a data network comprising the plurality of data routers and the plurality of data links; and a trace network comprising the one or more trace routers and the plurality of trace links, wherein the configuration information is routed from the component to the trace port via at least a section of the data network and at least a section of the trace network.

Example 6

The apparatus of example 1 or any other example, further comprising: a plurality of network interfaces, wherein individual network interface of the plurality of network interfaces is to connect a corresponding data port of a data router of the plurality of data routers to a corresponding component of a plurality of components.

Example 7

The apparatus of any of examples 1-6 or any other example, wherein the trace port comprises: a register bank comprising one or more registers; and one or more sniffer circuitries, wherein the register bank is to store the configuration information to configure the one or more sniffer circuitries.

Example 8

The apparatus of example 7 or any other example, wherein the one or more sniffer circuitries are to collect the trace information, and to transmit the trace information to the first trace router.

Example 9

The apparatus of example 8 or any other example, wherein the first trace router is to route the trace information and the configuration information in a time multiplexed manner.

Example 10

The apparatus of any of examples 1-6 or any other example, wherein the component is a processor.

Example 11

A system comprising: a memory; a processor; a data network comprising a plurality of data routers, the data network to couple the processor to the memory; and a trace network comprising one or more trace routers, wherein the processor is to transmit configuration information to a first data router of the plurality of data routers via the data network and the trace network.

Example 12

The system of example 11 or any other example, further comprising: a plurality of data links, wherein a data link of the plurality of data links is to couple two corresponding data routers of the plurality of data routers; and a plurality of trace links, wherein a trace link of the plurality of trace links is to couple a trace port of a corresponding data router of the plurality of data routers to a corresponding trace router of the one or more trace routers.

Example 13

The system of example 12 or any other example, wherein: at least one trace link of the plurality of trace links and at least one data link of the plurality of data links are to route the configuration information from the processor to the first data router.

Example 14

The system of any of examples 11-130 or any other example, wherein: the processor is to transmit configuration information to the first data router, to configure a trace port of the first data router.

Example 15

The system of example 14 or any other example, wherein the trace port comprises: one or more registers to store the configuration information.

Example 16

The system of any of examples 11-13 or any other example, wherein: a first trace router of the one or more trace routers is to transmit trace information to a testing arrangement that is external to the system.

Example 17

The system of example 16 or any other example, wherein: the trace network is to time multiplex transmission of the trace information and transmission of the configuration information.

Example 18

An apparatus comprising: a data network comprising a plurality of data routers; and a trace network to transmit:

trace information associated with the apparatus, and configuration information to configure a data router of the plurality of data routers.

Example 19

The apparatus of example 18 or any other example, wherein the trace network is to time multiplex the routing of the trace information and the configuration information.

Example 20

The apparatus of example 18 or any other example, wherein the trace network is to transmit the trace information and the configuration information at least in part in parallel.

Example 21

The apparatus of any of examples 18-20 or any other example, further comprising: a trace router included in the trace network; and one or more trace links included in the trace network, wherein the trace router and the one or more trace links are to transmit the configuration information to the data router.

Example 22

The apparatus of any of examples 18-20 or any other example, wherein the data router comprises a trace port coupled to a trace router of the trace network.

Example 23

The apparatus of example 22 or any other example, wherein the configuration information is to configure the trace port.

Example 24

The apparatus of example 22 or any other example, wherein the trace information is generated at least in part by the trace port.

Example 25

The apparatus of example 22 or any other example, wherein the trace port comprises one or more registers to store the configuration information.

Example 26

A method comprising: transmitting, via a data network, data and instructions; transmitting, via a trace network: trace information, and configuration information to configure a data router of the data network.

Example 27

The method of example 26 or any other example, wherein transmitting the trace information and configuration information comprises: time multiplexing the transmission of the trace information and the configuration information.

Example 28

The method of example 26 or any other example, wherein transmitting the trace information and configuration information comprises: transmitting, at least in part in parallel, the trace information and the configuration information.

Example 29

The method of any of examples 26-28 or any other example, wherein transmitting the trace information and configuration information comprises: transmitting, via a trace router and one or more trace links of the trace network, the configuration information to the data router.

Example 30

The method of any of examples 26-28 or any other example, wherein: the data router comprises a trace port coupled to a trace router of the trace network; wherein the configuration information is to configure the trace port; wherein the trace information is generated at least in part by the trace port; and wherein the trace port comprises one or more registers to store the configuration information.

Example 31

One or more non-transitory computer-readable storage media to store instructions that, when executed by a processor, cause the processor to execute a method of any of the examples 26-30 or any other example.

Example 32

An apparatus comprising: means for performing the method of any of the examples 26-30 or any other example.

Example 33

An apparatus comprising: means for transmitting, via a data network, data and instructions; means for transmitting, via a trace network: trace information, and configuration information to configure a data router of the data network.

Example 34

The apparatus of example 33 or any other example, wherein the means for transmitting the trace information and configuration information comprises: means for time multiplexing the transmission of the trace information and the configuration information.

Example 35

The apparatus of example 33 or any other example, wherein the means for transmitting the trace information and configuration information comprises: means for transmitting, at least in part in parallel, the trace information and the configuration information.

Example 36

The apparatus of any of examples 33-35 or any other example, wherein the means for transmitting the trace information and configuration information comprises: means for transmitting, via a trace router and one or more trace links of the trace network, the configuration information to the data router.

Example 37

The apparatus of any of examples 33-35 or any other example, wherein: the data router comprises a trace port coupled to a trace router of the trace network; wherein the configuration information is to configure the trace port; wherein the trace information is generated at least in part by the trace port; and wherein the trace port comprises one or more registers to store the configuration information.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a plurality of data routers to route data packets, wherein the plurality of data routers comprises:
    a first data router comprising a trace port;
    a second data router coupled to a component; and
    one or more trace routers to route trace information of the apparatus,
wherein a first trace router of the one or more trace routers is coupled to the trace port, and
wherein the first trace router is to route configuration information from the component to the trace port, the configuration information to configure the trace port,
wherein the trace port comprises:
a register bank comprising one or more registers, wherein the register bank is to store the configuration information;
one or more sniffer circuitries, wherein the register bank is to store the configuration information to configure the one or more sniffer circuitries.

2. The apparatus of claim 1, further comprising:
a plurality of data links, wherein individual data link of the plurality of data links is to couple two corresponding data routers of the plurality of data routers; and
a plurality of trace links, wherein individual trace link of the plurality of trace links is to couple a trace port of a corresponding data router of the plurality of data routers to a corresponding trace router of the one or more trace routers.

3. The apparatus of claim 2, wherein:
at least one trace link of the plurality of trace links and at least one data link of the plurality of data links are to route the configuration information from the component to the trace port.

4. The apparatus of claim 2, further comprising:
a configuration link that is to couple a data port of at least one data router of the plurality data routers and the first trace router,
wherein the configuration link, at least one trace link of the plurality of trace links, and at least one data link of the plurality of data links are to route the configuration information from the component to the trace port.

5. The apparatus of claim 2, further comprising:
a data network comprising the plurality of data routers and the plurality of data links; and
a trace network comprising the one or more trace routers and the plurality of trace links,
wherein the configuration information is routed from the component to the trace port via at least a section of the data network and at least a section of the trace network.

6. The apparatus of claim 1, further comprising:
a plurality of network interfaces, wherein individual network interface of the plurality of network interfaces is to connect a corresponding data port of a data router of the plurality of data routers to a corresponding component of a plurality of components.

7. The apparatus of claim 1, wherein the one or more sniffer circuitries are to collect the trace information, and to transmit the trace information to the first trace router.

8. The apparatus of claim 7, wherein the first trace router is to route the trace information and the configuration information in a time multiplexed manner.

9. The apparatus of claim 1, wherein the component is a processor.

10. A system comprising:
a memory to store one or more instructions;
a processor circuitry to execute the one or more instructions;
a data network comprising a plurality of data routers, the data network to couple the processor circuitry to the memory; and
a trace network comprising one or more trace routers,
wherein the processor circuitry is to transmit configuration information to a first data router of the plurality of data routers via the data network and the trace network,
wherein the processor circuitry is to transmit configuration information to the first data router, to configure a trace port of the first data router,
wherein the trace port comprises:
    a register bank comprising one or more registers, wherein the register bank is to store the configuration information; and
    one or more sniffer circuitries, wherein the register bank is to store the configuration information to configure the one or more sniffer circuitries.

11. The system of claim 10, further comprising:
a plurality of data links, wherein a data link of the plurality of data links is to couple two corresponding data routers of the plurality of data routers; and
a plurality of trace links, wherein a trace link of the plurality of trace links is to couple a trace port of a corresponding data router of the plurality of data routers to a corresponding trace router of the one or more trace routers.

12. The system of claim 11, wherein:
at least one trace link of the plurality of trace links and at least one data link of the plurality of data links are to route the configuration information from the processor to the first data router.

13. The system of claim 10, wherein:
a first trace router of the one or more trace routers is to transmit trace information to a testing arrangement that is external to the system.

14. The system of claim 13, wherein:
the trace network is to time multiplex transmission of the trace information and transmission of the configuration information.

15. An apparatus comprising:
a data network comprising a plurality of data routers, wherein a data router of the plurality of data routers includes a trace port; and
a trace network to transmit:
    trace information associated with the apparatus, and
    configuration information to configure a data router of the plurality of data routers, wherein the trace port comprises:
a register bank comprising one or more registers, wherein the register bank is to store the configuration information; and one or more sniffer circuitries, wherein the register bank is to store the configuration information to configure the one or more sniffer circuitries.

16. The apparatus of claim 15, further comprising:
a trace router included in the trace network; and
one or more trace links included in the trace network, wherein the trace router and the one or more trace links are to transmit the configuration information to the data router.

17. The apparatus of claim 15, wherein the trace network is to time multiplex the routing of the trace information and the configuration information.

18. The apparatus of claim 15, wherein the trace network is to transmit the trace information and the configuration information at least in part in parallel.

\* \* \* \* \*